United States Patent [19]

Ocvirk et al.

[11] Patent Number: 4,828,338

[45] Date of Patent: May 9, 1989

[54] BRAKE SYSTEM WITH SLIP CONTROL FOR AUTOMOTIVE VEHICLES WITH A DRIVEN AXLE AND A NON-DRIVEN AXLE

[75] Inventors: Norbert Ocvirk, Offenbach; Lutz Weise, Mainz; Horst P. Becker, Frankfurt am Main; Otto Determann, Darmstadt, all of Fed. Rep. of Germany

[73] Assignee: Alfred Teves GmbH, Frankfurt am Main, Fed. Rep. of Germany

[21] Appl. No.: 64,824

[22] Filed: Jun. 19, 1987

[30] Foreign Application Priority Data

Jul. 18, 1986 [DE] Fed. Rep. of Germany ....... 3624344

[51] Int. Cl.⁴ .................... B60T 13/68; B60T 8/64
[52] U.S. Cl. ................... 303/119; 303/111; 303/114; 60/547.1; 60/591; 180/197
[58] Field of Search .......... 60/547.1, 540, 563, 60/565, 582, 591; 180/197; 303/110, 111, 113, 114, 115, 116, 117, 119, 50, 52, 54

[56] References Cited

U.S. PATENT DOCUMENTS

| | | | |
|---|---|---|---|
| 4,589,706 | 5/1986 | Leiber | 303/119 X |
| 4,626,043 | 12/1986 | Beldrt et al. | 303/116 X |
| 4,685,547 | 8/1987 | Ohashi et al. | 180/197 X |
| 4,746,174 | 5/1988 | Buschmann | 180/197 X |

FOREIGN PATENT DOCUMENTS

| | | |
|---|---|---|
| 3404136 | 8/1985 | Fed. Rep. of Germany ...... 303/114 |
| 3505410 | 8/1986 | Fed. Rep. of Germany ...... 303/116 |
| 3527190 | 2/1987 | Fed. Rep. of Germany . |
| 3601914 | 7/1987 | Fed. Rep. of Germany . |
| 0143252 | 6/1986 | Japan ................. 303/116 |
| 2119883 | 11/1983 | United Kingdom ............. 303/119 |
| 2144188 | 2/1985 | United Kingdom . |
| 2155129 | 9/1985 | United Kingdom . |

Primary Examiner—Duane A. Reger
Assistant Examiner—Timothy Newholm
Attorney, Agent, or Firm—James B. Raden

[57] ABSTRACT

A brake system with slip control is disclosed including a master cylinder at whose working chambers the wheel brakes are connected via inlet/outlet valve pairs. A pressure compensation reservoir and an auxiliary pressure supply system are connected to the working chambers via a control valve. The inlet valves of the driven wheels and the auxiliary pressure supply system are connected to the working chambers of the master cylinder via multi-directional valves which are open in the rest position and which can be changed over during traction slip control. The inlet valves of the non-driven wheels directly communicate with the working chambers. In the traction slip control phase, the auxiliary pressure is limited to a maximum pressure required by means of a pressure relief valve.

8 Claims, 1 Drawing Sheet

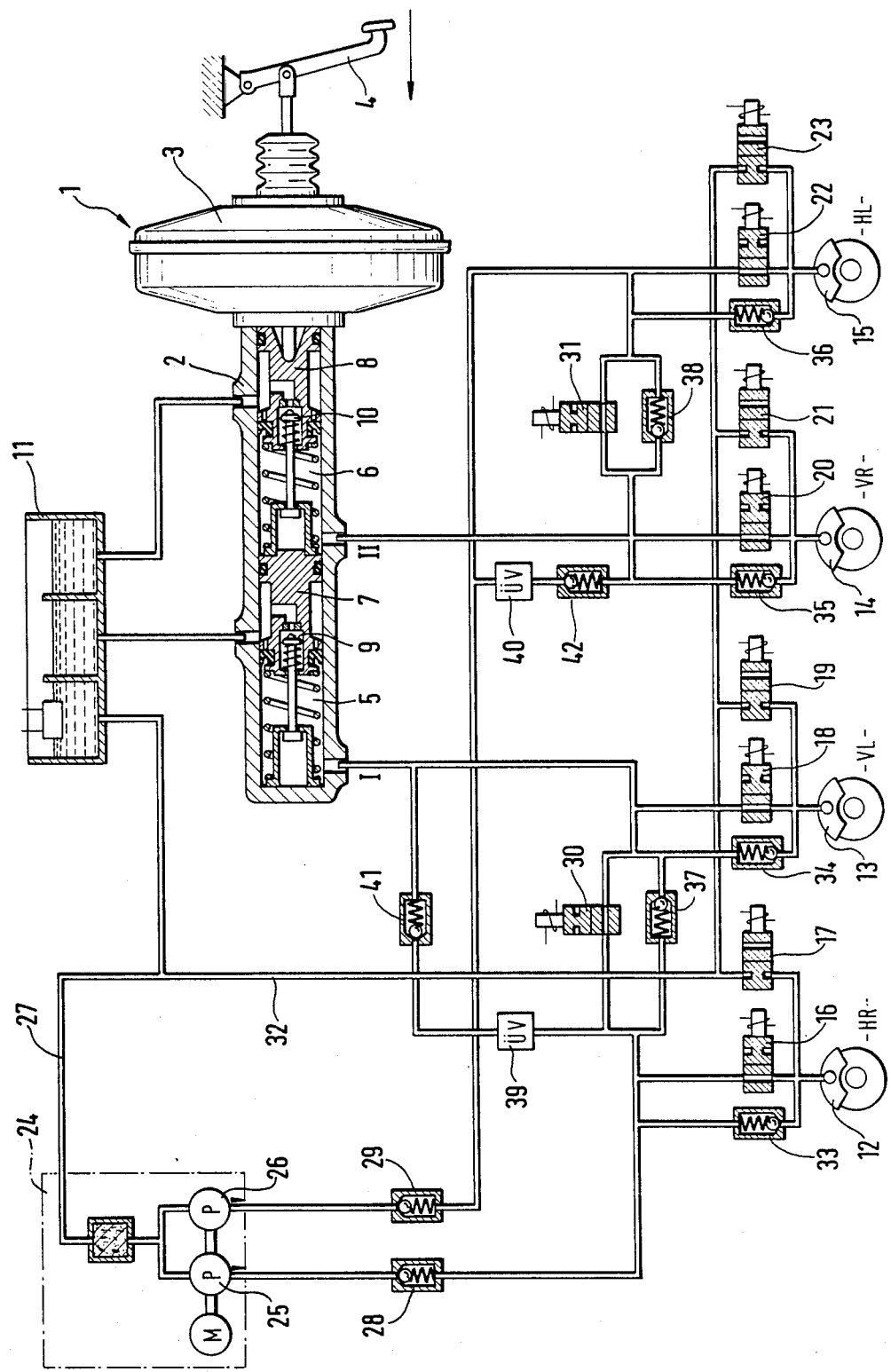

BRAKE SYSTEM WITH SLIP CONTROL FOR AUTOMOTIVE VEHICLES WITH A DRIVEN AXLE AND A NON-DRIVEN AXLE

BACKGROUND OF THE INVENTION

This invention relates to a slip-controlled brake system for automotive vehicles with a driven axle and a non-driven axle. The brake system has a master cylinder at whose working chamber there are connected a pressure medium storage/pressure compensation reservoir, an auxiliary pressure supply system which can be switched on in the control phases, and wheel brakes. In the connection of the working chamber to the reservoir a control valve is provided which in the brake released position of the master cylinder piston is open towards the reservoir, and which closes upon the actuation of the brake with the auxiliary pressure supply switched off. During metering-in of pressure medium from the auxiliary pressure supply system the control valve maintains a pressure in the working chamber of the master cylinder, which pressure is proportional to the force of the brake pedal.

The hydraulic brake system of this type is described in German published Patent Application No. P 36 01 914. That system has a master cylinder with a vacuum brake booster connected upstream and is equipped with an auxiliary pressure supply system. Connected to each of the working chambers within the master cylinder are one or several wheel brakes, the auxiliary pressure supply system and by way of a control valve, a pressure compensation reservoir. The control valve is open and establishes a communication towards the reservoir in the released position of the piston within the master cylinder when the brake is not operated. Upon brake application, the valve closes and remains closed as long as the pedal-actuation-released pressure in the working chamber of the master cylinder is lower than the auxiliary pressure. Upon the onset of slip control, the auxiliary pressure supply system is switched on and pressure medium is metered into the working chamber. Thereby the piston in the master cylinder is returned to its at rest position. The control valve is opened and remains opened until the forces on the piston have balanced. Even after the switching-on of the auxiliary pressure supply system, a controlled pressure prevails in the working chamber. The pressure is proportional to the force of the pedal. Upon an instabilization of any wheel, the braking pressure is varied by means of change-over multi-directional valves, namely inlet valves and outlet valves, inserted into the pressure medium paths from the wheel brakes to the master cylinder and to the reservoir, thus controlling the brake slip. This sytem, however, is not suited for traction slip control commonly referred to as "TSC".

There is already known a brake system with a hydraulic brake booster where, for traction slip control, the wheel brakes are directly connectible to the auxiliary pressure supply system by way of multi-directional valves. Such a system is disclosed in the published German published patent applicatio DE-OS No. 34 07 538. In that system, the braking pressure generator is a dual-circuit-type in which each circuit is connected to one driven and one non-driven wheel. During traction slip control the pressure medium path to the non-driven wheel is blocked by an additional multi-directional valve. Systems of this type are relatively intricate and expensive.

Another system provides a brake system having a tandem master cylinder with a vacuum brake booster connected upstream and an auxiliary pressure supply system which is switched on only during the control phases and which, instead of the braking pressure generator, can be connected to the wheel brakes by means of multi-directional valves. Such a system is disclosed in German Published Patent Application No. P 35 27 190. This brake system also requires a relatively intricate and expensive valve arrangement.

SUMMARY OF THE INVENTION

It is an object of the present invention to provide for a brake system of the type referred to above which system not only controls brake slip but also traction slip, with the expenditure of components being small.

It now has been found that this object can be achieved in a surprisingly simple, technically advanced manner according to the invention wherein the wheels are connected with the master cylinder and with the reservoir by means of individual wheel and/or individual axle inlet valves and outlet valves. For traction slip control one additional multi-directional valve is inserted into the pressure medium paths from the master cylinder to the inlet valves of the driven wheels, which additional multi-directional valve is open in the rest position and can be changed over to close during traction slip control ("TSC"). According to the invention, by way of a non-return valve the auxiliary pressure supply system is connected between the inlet valve of the driven wheel and the multi-directional valve which can be changed over to close during traction slip control.

By means of the inventive brake system it is possible to individually control the braking pressure at the wheels by means of the individual inlet/outlet valve pairs. With the front wheels being connected to one brake circuit and the rear wheels being connected to the second brake circuit, a joint control of braking pressure at the rear axle—preferably according to the select-low principle—will be possible by way of one common inlet/outlet valve pair.

Accordingly, traction slip control is incorporated into a system for controlling brake slip by means of merely one additional multi-directional valve per brake circuit. The described brake system, according to this invention, has the essential advantage that, even during traction slip control, it is possible to supply braking pressure into the non-driven wheels upon brake application without the traction slip control phase having to be terminated first.

According to an advantageous embodiment of this invention, the master cylinder is designed as tandem master cylinder at whose brake circuits there are connected one front wheel and one rear wheel - preferably by means of diagonal brake circuit allocation. Also possible is a so-called black-and-white allocation, that is connection of the two wheels of one axle to one brake circuit and of the wheels of the other axle ot the other brake circuit.

According to a further embodiment of this invention, two hydraulically separated hydraulic pumps driven by means of a common electric motor can be used for the auxiliary pressure supply, one of the pumps at a time being connected to one of the two brake circuits.

According to the invention, it is possible to connect non-return valves opening in the direction of pressure reduction in parallel with the inlet valves so as to accelerate the pressure decrease upon the termination of the braking operation, as well as in case of a delayed switching-back of the inlet valves.

The auxiliary pressure needed for traction slip control is considerably smaller than that required for brake slip control. Therefore, according to one embodiment of this invention, it is provided to connect a pressure relief valve in parallel with the multi-directional valve which can be changed over to lock during traction slip control. The pressure relief valve is dimensioned in accordance with the maximum pressure required for traction slip control. On the other hand, during traction slip control, it is also possible to limit the auxiliary pressure to the required maximum value by means of temporary or periodical pulse-actuated opening of the multi-directional valve. The pressure limitation to the lower level required for traction slip control can also be achieved by temporary or periodical changing-over of the outlet valve associated with the driven wheel.

BRIEF DESCRIPTION OF THE DRAWING

The invention will become evident from the following description with reference being made to the accompanying drawing which is a partial cross-sectional and diagrammatic representation of a brake system according to the invention.

DETAILED DESCRIPTION OF THE PREFERRED EMBODIMENT

As shown in the drawing, the brake system includes a braking pressure generator 1 composed of a tandem master cylinder 2 and a vacuum brake booster 3 connected upstream whereon the braking force is exerted by a pedal 4.

The two working chambers 5, 6 within the master cylinder 2 each are connected with a pressure medium storage/pressure compensation reservoir 11 by control valves 9, 10, which are designed as central valves upon the actuation of the brake. A braking pressure is built up in the working chambers 5, 6 by means of the two master cylinder pistons, namely the push rod piston 8 and the intermediate piston 7. Further, the wheel brakes are connected to the chambers 5, 6 by hydraulically separated brake circuits I, II. The connection from each chamber being to diagonally located front and rear brake. That is, brake circuit I leads to the left front wheel VL and to the right rear wheel HR and brake circuit II leads to the two other right front and left rear wheel brakes VR, HL.

In the embodiment shown, each wheel has an inlet valve and an outlet valve 16, 17; 18, 19; 20, 21; and 22, 23. Thus, by means of the valves it is possible to control the braking pressure individually at each wheel.

Further, the brake system is equipped with an auxiliary pressure supply system 24 which essentially includes at least one electric-motor-driven hydraulic pump, or as in the present embodiment, two hydraulic pumps 25, 26 driven by a common electric motor M. As shown, the pressure medium reservoir which also services the auxiliary pressure supply system 24 has been combined into one unit with the reservoir 11 of the tandem master cylinder 2. The reservoir 11 is connected to the suction sides of the hydraulic pumps 25, 26 by means of a pressure medium line 27.

By way of non-return valves 28 or 29 and multi-directional valves 30 or 31, which in the rest position are open, the delivery side of either pump 25 or 26 is connected with one of the two brake circuits I, II and thus with the respective working chamber 5 or 6 of the master cylinder 2. The non-return valves 28, 29 prevent pressure medium from flowing to the delivery sides of the pumps 25, 26. The multi-directional valves 30, 31 are locked only in the traction slip control phase, which will be explained further below.

The vehicle in the illustrated embodiment is a vehicle with rear wheel drive. By way of the non-return valves 28, 29, the pump connections each lead directly to the inlet valves 16 or 22 of the rear wheels HR, HL. By way of the multi-directional valves 30, 31, which can be changed over in the traction slip control phase, they lead to the inlet valves 18, 20 of the non-driven front wheels VL, VR. The non-driven wheels VL, VR or rather their inlet valves 18, 20 are thus directly hydraulically connected by a first pressure supply line to the working chambers 5, 6 of the master cylinder 2, i.e., without any valves being interconnected.

After changing over into their second switching positions, the wheel-individual outlet valves 17, 19, 21, 23 will open a pressure medium return path to the reservoir 11 via a common pressure medium return line 32.

One non-return valve 33, 34, 35, 36 each is connected in parallel with one of the inlet valves 16, 18, 20, 22 so as to ensure a qick, undelayed pressure decrease upon the release of the brake.

Likewise, non-return valves 37, 38 are connected in parallel by a second pressure supply line with the multi-directional valves 30, 31 in the pressure medium path from the auxiliary pressure supply system 24 to the non-driven wheels VL, VR. By way of the valves 37, 38, it is possible to supply braking pressure to the inlet valves 16, 22 of the driven rear wheels HR, HL in case of brake application if the TSC valve 30, 31 should jam, for instance, due to some defect. In practice, it is possible to do without the non-return valve. Thus, as shown, the multi-directional valves 30, 31 are located in a line intersecting the second pressure supply line between the supply system and the inlet valves 16, 22 of the driven wheel brakes HR, HL.

Connected in parallel with the multi-directional valves 30, 31—the so-called TSC valves—which in case of traction slip control are changed over is a further pressure relief valve 39, 40 each of which is dimensioned to provide for the maximum auxiliary pressure required for traction slip control, which pressure is considerably lower than the pressure required for brake slip control. The non-return valves 41, 42 connected downstream symbolize the direction of action of the pressure relief valve. The action of the pressure relief valves 39, 40 can also be accomplished by temporary or pulsed switching-back of the TSC valve 30 or 31 into the open position. A pressure limitation in case of traction slip control is also achievable by temporary or pulsed changing-over of the outlet valves 17, 23 associated with the driven wheels.

The control valves 9, 10 in the master cylinder 2, like usual central valves, are open when the two pistons 7, 8 are in their retracted positions with the brake system not being operated and the auxiliary pressure supply system 24 being switched off. The pressure medium path from the working chambers 5, 6 to the reservoir 11 is open in this position. Upon brake application, the pistons 7, 8 advance and lock the pressure medium path from the chambers 5, 6 to the reservoir 11. Now, however, auxiliary pressure being supplied from the supply system 24 into the working chambers 5, 6 by the TSC valves 30, 31, the control valves 9, 10 start operating. The auxiliary pressure resets the pistons 7, 8 in opposition to the braking force exerted on the brake pedal 4 as boosted by the auxiliary energy of the vacuum booster. The control valves 9, 10 open the pressure medium path to the reservoir 11 until there is a pressure balance at the two master cylinder pistons 7, 8. Consequently, there prevails a controlled pressure in the working chambers 5, 6 which is proportional to the force exerted on the pedal 4.

The illustrated brake system according to this invention works as follows:

During normal braking actions, i.e., during uncontrolled braking actions, all valves maintain their illustrated rest positions. The auxiliary pressure supply system 24 is switched off. The braking pressure caused in the working chambers 5, 6 due to the pedal actuation is supplied to the wheel brakes 12, 13, 14, 15 by the inlet valves 16, 18, 20, 22, with the pressure medium supplied to the wheel brakes 12, 15 of the driven rear wheels and flowing by way of the TSC valves 30, 31.

When a wheel lock-up tendency occurs, the motor M of the hydraulic pumps 25, 26 is switched on. Thus the control valves 9, 10 start operating as soon as the auxiliary pressure increases in the chambers 5, 6 and exceeds the pressure released by the pedal actuation. Due to the fact that a respective amount of the pressure medium delivered by the pumps 25, 26 flows off to the reservoir 11, the pressure proportional to the energy applied to the pedal is kept up in the chambers 5, 6. The braking pressure is controlled individually at each wheel by means of the inlet/outlet valve pairs 16, 17; 18, 19; 20, 21; and 22, 23, i.e., the pressure is decreased, kept constant, and reincreased at the appropriate time.

In case of excessive traction slip, the auxiliary pressure supply system 24 is likewise switched on. Simultaneously, the TSC valves 30, 31 are changed over so that the auxiliary pressure can reach the wheel brakes 12, 15 of the driven rear wheels exclusively through the inlet valves 16, 22. The maximum auxiliary pressure at the input of the inlet valves 16, 22 is limited as the pressure relief valves 39, 40 which open as soon as the auxiliary pressure exceeds the pressure required at the maximum for traction slip control and open a pressure medium path to the reservoir 11 by way of the non-return valves 41, 42 and the non-pressurized working chambers 5, 6. By means of temporary or pulsed actuation of the TSC valves 30, 31, in this control phase, it is likewise possible to limit the auxiliary pressure to the maximum value required. A similar effect can be achieved by means of the outlet valves 17, 23 as already indicated.

In the traction slip control phase, too, it is possible to control the braking pressure in the wheel brakes 12, 15 of the driven rear wheels individually at each wheel by means of the appertaining inlet/outlet valve pairs 16, 17; 22, 23. The non-driven wheels VL, VR continue to be connected to the unpressurized master cylinder 2, thus in this phase it is impossible to meter braking pressure into the wheel brakes 13, 14 of the wheels VR, VL.

An important advantage of the inventive brake system is that, upon a brake application and in case of the traction slip control phase not yet being terminated, the braking action will come on immediately at the non-driven wheels VL, VR as there is no further valve in the pressure medium paths to the wheels, with the exception of the inlet valves 18, 20, which remain in their rest positions during the traction slip control phase.

Despite the simple design and the relatively small number of components, wheel-individual braking pressure control is possible by means of the inventive brake system both in the traction slip control phase and in the brake slip control phase.

For the sake of better clarity and better comprehension of the invention, the electric components required for brake system of the described type are not shown. Particularly, the wheel sensors by means of which the rotational behavior of the wheels is registered are not shown. Likewise, not represented are the electronic circuits for evaluating the sensor signals and for generating electric change-over and control signals for the illustrated and described electromagnetically operable multi-directional valves as well as for switching the drive motor M of the hydraulic pumps on and off.

What is claimed is:

1. A brake system including slip control and traction control for automotive vehicles having a driven axle and a non-driven axle, comprising:
   a master cylinder having a working chamber connected to a pressure medium storage/pressure compensation reservoir and also being connected to an inlet valve of a non-driven wheel brake via a first pressure supply line;
   an auxiliary pressure supply system, said supply system operating during brake slip control and traction slip control phases and connected via at least one non-return valve and a second pressure supply line to an inlet valve of a driven wheel brake;
   an outlet valve at each wheel brake connecting said brake to said reservoir;
   a control valve connected between the working chamber and the reservoir, said control valve being open when a master cylinder piston is in a rest position and being closed upon brake actuation when the auxiliary pressure supply system is not operating, said valve regulating a fluid pressure in the working chamber when the auxiliary pressure supply system is operating so as to maintain said regulated fluid pressure in proportion to a brake pedal force; and
   an additional multi-directional valve connecting the driven wheel brake inlet valve with the non-driven wheel brake inlet valve, said additional multi-directional valve being located in a line intersecting with said second pressure supply line between said supply system and the inlet valve of said driven wheel brake, control means being provided to control said additional multi-directional valve so that said additional multi-directional valve is closed during the traction slip control phase and is open at all other times so as to connect driven to non-driven wheel brake circuits;
   whereby fluid pressure in the working chamber as augmented by the auxiliary pressure supply system is applied to both driven and non-driven wheel brakes during normal braking and brake slip control phases, and fluid pressure from the auxiliary pressure supply system alone is applied to only the driven wheel brake during the traction slip control phase.

2. A brake system as claimed in claim 1, wherein the master cylinder is designed as a tandem master cylinder connected to two brake circuits, each circuit connected to one front wheel and one rear wheel.

3. A brake system as claimed in claim 2, wherein the allocation of the two brake circuits of the tandem master cylinder is diagonally across the vehicle.

4. A brake system as claimed in claim 2, wherein the auxiliary pressure supply system includes two hydraulically separated pumps each driven with a common electric-motor drive, each of said pumps being connected to one brake circuit of the tandem master cylinder.

5. A brake system as claimed in claim 4, wherein a further non-return valve opens in the direction of wheel brake pressure reduction, and is connected in parallel with the inlet valves.

6. A brake system as claimed in claim 5, wherein a pressure relief valve is connected in parallel to the multi-directional valve, said pressrue relief valve being dimensioned in accordance with a required maximum pressure for traction slip control.

7. A brake system as claimed in claim 5, further including means operable during traction slip control for limiting the auxiliary pressure to the maximum pressure required for traction slip control including means for temporarily a periodically pulse-actuated opening of the multi-directional valve.

8. A brake system as claimed in claim 5, further including means operable during traction slip control for limiting the auxiliary pressure by temporary or periodical pulse-actuated opening of the outlet valves associated with the driven wheels.

* * * * *